United States Patent
Baldy et al.

(12)

(10) Patent No.: US 6,281,272 B1
(45) Date of Patent: Aug. 28, 2001

(54) LOW TEMPERATURE CURE WATERBORNE COATING COMPOSITIONS HAVING IMPROVED APPEARANCE AND HUMIDITY RESISTANCE AND METHODS FOR COATING SUBSTRATES

(75) Inventors: Heidi M. Baldy; Dennis L. Faler, both of Pittsburgh; Daniel E. Rardon, Gibsonia; Gina M. Terrago, Wexford, all of PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 0 days.

(21) Appl. No.: 09/250,119

(22) Filed: Feb. 16, 1999

Related U.S. Application Data

(60) Provisional application No. 60/075,030, filed on Feb. 18, 1998.

(51) Int. Cl.$^7$ .................. C09D 15/08; C09D 167/08; C09D 151/06
(52) U.S. Cl. .................. 523/501; 523/522; 523/526; 523/527; 523/127; 523/165; 523/167; 523/374; 523/377; 523/437; 523/440
(58) Field of Search .................. 523/501, 522, 523/526, 527; 524/845; 525/440, 443, 127, 165, 167, 374, 377, 437

(56) References Cited

U.S. PATENT DOCUMENTS

| | | | |
|---|---|---|---|
| Re. 33,008 | 8/1989 | Ruffner et al. | 526/270 |
| 3,684,759 | 8/1972 | Reiff et al. | 260/29.6 NR |
| 4,070,323 | 1/1978 | Vanderhoff et al. | 260/29.6 NR |
| 4,271,051 | 6/1981 | Eschwey | 260/22 M |
| 4,335,029 | 6/1982 | Dabi et al. | 524/589 |
| 4,451,596 * | 5/1984 | Wilk et al. | 523/501 |
| 4,616,074 | 10/1986 | Ruffner | 526/318 |
| 4,719,132 | 1/1988 | Porter, Jr. | 427/409 |
| 4,791,168 | 12/1988 | Salatin et al. | 524/601 |
| 4,851,460 | 7/1989 | Stranghöner et al. | 523/407 |
| 5,015,688 | 5/1991 | Bederke et al. | 524/600 |
| 5,026,818 | 6/1991 | Heinz et al. | 528/313 |
| 5,071,904 | 12/1991 | Martin et al. | 524/458 |
| 5,098,947 | 3/1992 | Metzger et al. | 524/507 |
| 5,136,004 | 8/1992 | Bederke et al. | 526/273 |
| 5,155,163 | 10/1992 | Abeywardena et al. | 524/591 |
| 5,342,882 | 8/1994 | Göbel et al. | 524/832 |
| 5,354,807 | 10/1994 | Dochniak | 524/591 |
| 5,356,973 | 10/1994 | Taljan et al. | 524/314 |
| 5,368,944 | 11/1994 | Hartung et al. | 428/423.1 |
| 5,401,790 | 3/1995 | Poole et al. | 524/199 |
| 5,412,023 | 5/1995 | Hille et al. | 524/539 |
| 5,459,197 | 10/1995 | Schwindt et al. | 524/591 |
| 5,460,892 | 10/1995 | Bederke et al. | 428/482 |
| 5,468,802 | 11/1995 | Wilt et al. | 524/539 |
| 5,510,148 | 4/1996 | Taljan et al. | 427/409 |
| 5,554,686 | 9/1996 | Frisch, Jr. et al. | 524/588 |
| 5,589,534 | 12/1996 | Metzger et al. | 524/548 |
| 5,614,584 | 3/1997 | Schwan et al. | 524/591 |
| 5,635,559 | 6/1997 | Brock et al. | 524/839 |
| 5,646,214 | 7/1997 | Mayo | 525/10 |
| 5,648,410 | 7/1997 | Hille et al. | 523/501 |
| 5,684,072 | 11/1997 | Rardon et al. | 524/199 |
| 5,698,330 | 12/1997 | Bederke et al. | 428/423.1 |
| 5,703,155 | 12/1997 | Swarup et al. | 524/558 |
| 5,741,552 | 4/1998 | Takayama et al. | 427/407.1 |
| 5,759,694 | 6/1998 | Mayo et al. | 428/423.1 |
| 5,814,410 | 9/1998 | Singer et al. | 428/423.1 |
| 5,925,698 | 7/1999 | Steckel | 524/322 |

FOREIGN PATENT DOCUMENTS

| | | |
|---|---|---|
| 2627320 | 12/1997 | (DE) . |
| 69839 B1 | 1/1983 | (EP) . |
| 0038127 | 10/1984 | (EP) . |
| 0210747 | 2/1987 | (EP) . |
| 0238166 B1 | 9/1991 | (EP) . |
| 0567214 A1 | 10/1993 | (EP) . |
| 0238166 B2 | 9/1994 | (EP) . |
| 0794212 | 9/1997 | (EP) . |
| 1579672 | 11/1980 | (GB) . |
| WO 9405733 * | 3/1994 | (WO) .................. C09D/5/02 |
| WO 95/07951 | 3/1995 | (WO) . |
| WO95/27013 | 10/1995 | (WO) . |
| WO 9706219 * | 2/1997 | (WO) .................. C09D/171/02 |
| WO97/30097 | 8/1997 | (WO) . |

OTHER PUBLICATIONS

English Abstract for EP 69839.
English Abstract for DE 2627320.
J. Nelson et al., "Castor–Based Derivatives: Synthesis of Some Acrylate Esters", J. Am. Oil Chem Society 43(9) 1966 pp. 542–545.

\* cited by examiner

Primary Examiner—David W. Wu
Assistant Examiner—Kelechi C. Egwim
(74) Attorney, Agent, or Firm—Deborah M. Altman

(57) ABSTRACT

A waterborne coating composition having a crosslinking agent and a dispersion of polymeric microparticles in an aqueous medium wherein the microparticles are prepared by first forming a mixture in the aqueous medium of ethylenically unsaturated monomers and a substantially hydrophobic, saturated fatty acid-containing polyester. The amount of fatty acid used to prepare the polyester ranges from about 20 to 80 weight percent of the total weight of the fatty acid-containing polyester. The fatty acid-containing polyester contains functional groups which are capable of reacting with the crosslinking agent. The mixture is particularized into microparticles by high stress techniques, followed by polymerization of polymerizable species within the microparticles to produce the polymeric microparticles. The amount of the fatty acid-containing polyester in the dispersion is at least 10 and up to 70 weight percent based on weight of the ethylenically unsaturated monomers and fatty acid-containing polyester. The amount of the polymeric microparticles in the coating composition is from 20 to 80 weight percent based on total weight of resin solids in the coating composition.

13 Claims, No Drawings

LOW TEMPERATURE CURE WATERBORNE COATING COMPOSITIONS HAVING IMPROVED APPEARANCE AND HUMIDITY RESISTANCE AND METHODS FOR COATING SUBSTRATES

CROSS-REFERENCE TO RELATED APPLICATION

This patent application is related to provisional U.S. patent application Ser. No. 60/075,030 entitled "Low Temperature Cure Waterborne Coating Compositions Having Improved Appearance And Humidity Resistance", filed Feb. 18,1998.

FIELD OF THE INVENTION

The present invention relates to waterborne coating compositions, and more particularly to waterborne coating compositions containing fatty acid-containing polyesters and having improved appearance and improved humidity resistance at low baking temperatures.

BACKGROUND OF THE INVENTION

Several trends within the automotive industry point to the need for waterborne coatings which have good physical properties and appearance when baked at lower than normal cure temperatures. One trend within the industry has been the effort to reduce atmospheric pollution due to volatile organic solvents emitted during the painting process. One approach to this end has been to develop waterborne coating compositions which contain less organic solvents. Another way to reduce emissions and to cut energy expenditure is to lower the temperature at which the coating is baked or cured; less fuel is required to heat an oven to a lower temperature and consequently there is less carbon dioxide emitted to the atmosphere.

Another trend is the increasing use of automobile body parts made of thermoplastic olefins which deform at normal bake temperatures. Such parts are usually painted in separate operations using coatings which are different from the coatings used to paint the metallic parts of the automobile body.

Defects in automotive topcoats which occur during application are usually repaired separately and with a minimum amount of damage to the original coating. In order to avoid overbaking the original coating, it is desirable to have repair coatings which can be cured at lower bake temperatures. Currently, it is common in automotive plants to use different coatings for metallic parts and plastic parts and to repair defects, even though all are being applied to the same automobile. Since it is difficult for coatings with different compositions to have the same appearance, it is highly desirable to have one universally applicable waterborne coating that will perform well for different applications at both low and normal cure temperatures. If different coatings must be used for the different applications, then it is desirable that the coatings have compositions as similar as possible.

Waterborne automotive coatings containing water dispersible fatty acid-containing polyesters or alkyds are known. U.S. Pat. No. 5,412,023 teaches the use of a polyester polyol containing isomerized soybean fatty acid with an acid value of 34. However, this patent specifically teaches that the polyester polyol must contain sufficient ionic groups to be stably dispersed into water. U.S. Pat. Nos. 4,851,460 and 5,342,882 teach the use of a water dispersible polyester with an acid value of 86.5 made from epoxidized linseed oil. When acrylic monomers are polymerized in the presence of such a dispersion, the result is a polyester/acrylic dispersion that is stabilized by the ionic functionality of the hydrophilic polyester. In none of these cases is there any indication that resins made from fatty acid-containing polyesters would be suitable for coatings cured at low baking temperatures.

In order to decrease damage to automotive coatings due to the effects of acid rain, some coatings manufacturers have been making modifications to topcoats that make them more hydrophobic. Such modifications can cause a decrease in adhesion when another coating is applied to them to repair defects. The coating used to repair defects must be adapted to overcome any loss in adhesion caused by the hydrophobic nature of the coating being repaired.

Unfortunately, as the baking temperature for a coating is decreased, the rate and degree of curing is also decreased. This is particularly true for coatings which are cured using aminoplast crosslinking agents. A low degree of cure can result in a weakening of the physical properties of the coating, and in particular, a reduction in the degree of cure can result in a decrease in the cohesive and adhesive strength of the coating, especially when the coating is subjected to a humid environment.

Therefore, in order to obtain the advantages of a low bake temperature, a means must be found to overcome the loss of physical properties associated with a lower degree of cure. In addition, a low temperature cure waterborne coating must still have all the characteristics required of an automotive coating, such as smoothness, metallic flake orientation, and broad application latitude.

SUMMARY OF THE INVENTION

In accordance with the present invention, a waterborne coating composition is provided comprising pigment, a crosslinking agent, and a polymeric film-forming resin. The polymeric film-forming resin is a latex which comprises a dispersion of polymeric microparticles prepared by forming a mixture in an aqueous medium of an ethylenically unsaturated monomer or mixture of ethylenically unsaturated monomers with greater than 10 percent by weight of a substantially hydrophobic, saturated fatty acid-containing polyester, the percent by weight being based on weight of ethylenically unsaturated monomer(s) and fatty acid-containing polyester.

The fatty acids from which fatty acid-containing polyesters are prepared are long chain aliphatic saturated carboxylic acids derived from naturally occurring fats and oils. The fatty acid-containing polyester has a number average molecular weight greater than about 600 as measured by gel permeation chromatography using a polystyrene standard, and is prepared from about 20 to 80 (preferably between 20 to 50) percent by weight of a fatty acid, based on total weight of the fatty acid-containing polyester. The mixture of ethylenically unsaturated monomer(s) and fatty acid-containing polyester is particularized into microparticles by high stress techniques followed by polymerizing the polymerizable species to form the polymeric microparticles which are stably dispersed in the aqueous medium.

The present invention provides a waterborne coating composition, comprising: a) a dispersion of polymeric microparticles in an aqueous medium wherein the microparticles are prepared by (i) forming a mixture in the aqueous medium of ethylenically unsaturated monomers and a substantially hydrophobic, saturated fatty acid-containing polyester, wherein the amount of fatty acid used to prepare the polyester ranges from about 20 to 80 weight percent of the total weight of the fatty acid-containing polyester, the fatty acid-containing polyester containing functional groups which are capable of reacting with a crosslinking agent; and (ii) particularizing the mixture into microparticles by high stress techniques followed by (iii) polymerizing polymerizable species within the microparticles to produce the polymeric microparticles; the amount of the fatty acid-containing polyester in the dispersion being at least 10 and up to 70 weight percent based on weight of the ethylenically unsaturated monomers and fatty acid-containing polyester, and the amount of the polymeric microparticles in the coating composition being from 20 to 80 weight percent based on total weight of resin solids in the coating composition and b) a crosslinking agent.

Another aspect of the present invention is a method for coating an elastomeric substrate, comprising the steps of: (a) applying a layer of the above waterborne coating composition upon a surface of an elastomeric substrate to form a film on the surface of the substrate; and (b) heating the coated substrate at a temperature of less than 93° C. (200° F.) such that the waterborne coating composition is cured.

Yet another aspect of the present invention is a method for repairing a coating defect on the surface of a coated substrate, comprising the steps of: (a) applying the above waterborne coating composition to the defect; and (b) heating the coated substrate at a temperature of less than 93° C. (200° F.) to cure the waterborne coating composition.

DETAILED DESCRIPTION OF THE INVENTION

The film-forming waterborne coating composition of the present invention comprises a dispersion of polymeric microparticles in an aqueous medium as a polymeric film-forming resin. The polymeric film-forming resin is present in the waterborne coating composition in amounts of about 20 percent to 80 percent, based on total weight of resin solids in the coating composition.

The microparticles contain between about percent to 70 percent by weight, preferably between to 50 weight percent, and more preferably about percent to 40 percent by weight of a substantially hydrophobic fatty acid-containing polyester, the percent by weight being based on the total weight of ethylenically unsaturated monomer(s) and fatty acid-containing polyester. By "substantially hydrophobic", it is meant that upon mixing a sample of polyester with an organic component and water, a majority of the polyester is in the organic phase and a separate aqueous phase can be observed. In order for the polyester to be substantially hydrophobic, the polyester must not contain enough acid or ionic functionality to allow it to form stable dispersions in water. The amount of acid functionality in a resin can be measured by acid value, the number of milligrams of KOH per gram of solid required to neutralize the acid functionality in the resin. Preferably, the acid value of the polyester is below about 20, and more preferably less than 10, and even more preferably the acid value is below about 5. Polyesters with low acid values can be water dispersible if they contain other hydrophilic components such as polyethylene ethers. However, such polyesters are not substantially hydrophobic if they are water dispersible no matter what their acid value is.

The fatty acid-containing polyester has a number average molecular weight greater than about 600, preferably between 600 and 4000, more preferably about 1500 to 4000, and even more preferably about 2000 to 3000. The term "molecular weight" refers to a number average molecular weight as determined by gel permeation chromatography using a polystyrene standard. Therefore, it is not an absolute number average molecular weight which is measured, but a number average molecular weight which is a measure relative to a set of polystyrene standards.

The fatty acid-containing polyester is adapted to be chemically bound into the cured coating composition; that is, the polyester contains free functional groups such as hydroxyl groups which are capable of reacting with a crosslinking agent.

The fatty acid-containing polyester may be prepared in a known manner by condensation of fatty acids, polyols, and polycarboxylic acids. The fatty acid-containing polyester may optionally contain other components included to modify certain of its properties.

Saturated fatty acids are preferred. Examples of suitable fatty acids include lauric acid, stearic acid, isostearic acid, oleic acid, coconut fatty acid, myristic acid, palmitic acid, and arachidic acid. Hydrogenated dimer fatty acids may also be used.

In addition to the fatty acid, the fatty acid-containing polyester contains from 0 to 50 percent by weight of one or more different polycarboxylic acids, based on total weight of the fatty acid-containing polyester. Examples of suitable polycarboxylic acids are given in U.S. Pat. No. 5,071,904, at column 3, line 4 and lines 15–17. Dicarboxylic acids or anhydrides such as isophthalic acid, phthalic anhydride, adipic acid, and maleic anhydride are preferred. Monocarboxylic acids, such as benzoic acid, can be used in addition to polycarboxylic acids in order to improve properties or modify the molecular weight or the viscosity of the polyester.

The fatty acid-containing polyester also contains one or more polyols at about to 40 percent by weight, preferably about to 30 percent by weight, based on total weight of the fatty acid-containing polyester. Examples of suitable polycarboxylic acids are also given in U.S. Pat. No. 5,071,904 at column 3, lines 9–13. Polyols with a hydroxyl functionality greater an two such as pentaerythritol, trimethylolpropane, and glycerol are preferred. Diols and monofunctional alcohols such as neopentylglycol, trimethylpentanediol, or tridecyl alcohol can be used in addition to other polyols with higher functionality to improve properties or control the viscosity of the polyester.

The fatty acid-containing polyester may optionally contain other components included to modify certain of its properties. For example, the polyester may be modified with one or more isocyanate functional components to form a urethane-modified polyester having improved properties such as durability or chip resistance. Examples of suitable isocyanates are isophorone diisocyanate, dimer diisocyanate, and phenyl isocyanate. The urethane-modified polyester can be formed from up to 40 weight percent of isocyanate monomer, based on the weight of the fatty acid-containing polyester. In the claims, the phrase "fatty acid-containing polyester" means fatty acid-containing polyesters and/or urethane-modified polyesters.

The fatty acid-containing polyester may be adapted so that a portion of it can be grafted onto an acrylic and/or a vinyl polymer. That is, the fatty acid-containing polyester may be chemically bound to an ethylenically unsaturated component that is capable of undergoing free radical copolymerization with acrylic and/or vinyl monomers. One means of making the fatty acid-containing polyester graftable is by including in its composition an ethylenically unsaturated acid or anhydride such as crotonic acid, maleic anhydride, or methacrylic anhydride. Grafting of the fatty acid-containing polyester to an acrylic polymer may also be accomplished by the incorporation in the polyester of an unsaturated fatty acid such linoleic acid. An isocyanate-functional 1:1 adduct of hydroxyethyl methacrylate and isophorone diisocyanate can also be reacted with hydroxyl functionality in the fatty acid-containing polyester to make it copolymerizable with acrylic monomers.

The balance of the microparticle comprises a polymer of an ethylenically unsaturated monomer or mixture of ethylenically unsaturated monomers. The ethylenically unsaturated monomer or mixture of ethylenically unsaturated monomers is selected from acrylic and vinyl monomers. The acrylic monomers include alkyl esters of acrylic acid or methacrylic acid. Suitable alkyl esters of acrylic acid or methacrylic acid include methyl methacrylate, ethyl methacrylate, butyl methacrylate, ethyl acrylate, butyl acrylate, and 2-ethylhexyl acrylate. Suitable other copolymerizable ethylenically unsaturated monomers include vinyl aromatic compounds such as styrene and vinyl toluene; nitriles such acrylonitrile and methacrylonitrile; vinyl and vinylidene halides such as vinyl chloride and vinylidene fluoride and vinyl esters such as vinyl acetate. Acrylic monomers such as butyl acrylate, lauryl methacrylate, or 2-ethylhexyl acrylate are preferred due to the hydrophobic, low Tg nature of the polymers that they produce.

Where the polymer is of the crosslinking type, suitable functional monomers may be used in addition to the other acrylic monomers mentioned above and include, for example, acrylic acid, methacrylic acid, hydroxyalkyl acrylates, and hydroxyalkyl methacrylates. Also, the acrylic polymer can be prepared with N-(alkoxymethyl)acrylamides and N-(alkoxymethyl)methacrylamides.

The polymeric microparticle may or may not be internally crosslinked. When the microparticles are internally crosslinked, they are referred to as a microgel. Monomers used in preparing the microparticle so as to render it internally crosslinked include those ethylenically unsaturated monomers having more than one site of unsaturation, such as ethylene glycol dimethacrylate, which is preferred; allyl methacrylate; hexanediol diacrylate; methacrylic anhydride; tetraethylene glycol diacrylate; tripropylene glycol diacrylate, and the like.

The dispersion of polymeric microparticles in aqueous medium is prepared by a high-stress technique using a homogenizer. This technique is described in U.S. Pat. No. 5,071,904 at column 5, line 59 to column 6, line 38, incorporated herein by reference. In this technique the monomer(s) and hydrophobic polyester are mixed together to form a pre-emulsion and particularized into microparticles by subjecting the pre-emulsion to high-shear stress using a homogenizer. The ethylenically unsaturated monomer(s) are then polymerized to form polymeric microparticles which are stably dispersed in the aqueous medium.

Microparticles can have a core/shell morphology if suitable hydrophilic ethylenically unsaturated monomer(s) are included in the mixture of monomer(s) and fatty acid-containing polyester. Due to its hydrophobic nature, the fatty acid-containing polyester will tend to be incorporated into the interior, or core, of the microparticle and the hydrophilic monomer(s) will tend to be incorporated into the exterior, or shell, of the microparticles. Suitable hydrophilic monomers include, for example, acrylic acid, methacrylic acid, vinyl acetate, N-methylol acrylamide, hydroxyethyl acrylate, and hydroxypropyl methacrylate. As mentioned in U.S. Pat. No. 5,071,904, it may be desirable to add water soluble monomer(s) after the other components of the dispersion of polymeric microparticles have been particularized into microparticles.

Acrylic acid is a particularly useful hydrophilic monomer for the present invention. Interactions among microparticles are greatly affected by the ionic charge density on the surface of the microparticles. Charge density can be affected by changing the amount of acrylic acid polymerized into the shell of a microparticle. The amount of acrylic acid incorporated into the shell of a microparticle can be increased by increasing the pH of the aqueous medium in which the polymerization takes place.

Core/shell microparticles in which the shell polymer is not polymerized from hydrophilic monomers can be made in a two-step process described in J. Macromol. Sci., Pure Appl. Chem. (1995), A32(8&9), 1445–60. The first step consists of preparing a dispersion of microparticles using the high-shear technique described above and the second step consists of adding additional monomer(s) to the polymeric dispersion and polymerizing for a second time.

Suitable crosslinking agents present in the waterborne coating composition of the present invention are the amine or amide-aldehyde condensates (aminoplasts) or the polyisocyanate curing agents as are well known in the art. Examples of suitable crosslinking agents are given in U.S. Pat. No. 5,071,904, column 9, line 12 to column 10, line 2. Aminoplast crosslinking agents are preferred. The crosslinking agent is present in the waterborne coating composition in amounts of 0 to 50 weight percent, preferably about 5 percent to 40 percent, and more preferably 5 to percent based on total weight of resin solids in the coating composition.

The coating composition further contains pigments to give it color. Color pigments conventionally used in surface coatings include inorganic pigments such as titanium dioxide, iron oxides, chromium oxide, lead chromate, and carbon black, and organic pigments such as phthalocyanine blue and phthalocyanine green. Mixtures of the above-mentioned pigments may also be used.

Compositions containing metallic flake pigmentation are useful for the production of so-called "glamour metallic" finishes chiefly upon the surface of automobile bodies. Suitable metallic pigments include in particular aluminum flake, copper bronze flake and metal oxide coated mica, nickel flakes, tin flakes, and mixtures thereof.

In general, the pigment is incorporated into the coating composition in amounts of about 1 to 80 percent, usually about 1 to 30 percent by weight based on total weight of the coating composition.

If desired, the coating composition may contain other optional materials well known in the art of formulated surface coatings. These would include surfactants, flow control agents, thixotropic agents, fillers, anti-gassing agents, organic cosolvents, catalysts, and other customary auxiliaries. These materials can constitute up to 40 percent by weight of the total weight of the coating composition.

The coating composition of the present invention may optionally include one or more co-binder resins used in conjunction with the aqueous dispersion of microparticles described herein, preferably in an amount from 0 to 30 weight percent. Examples of co-binders may include, but are not limited to, polyesters, polyethers, polycarbonates, epoxies, acrylics, polyurethanes, or hybrids. These materials should be added at levels which do not detract from the properties of the film-forming resin of the current invention.

Although the waterborne coating composition of the present invention may be cationic, anionic, or nonionic, preferably it is anionic. The waterborne coating of the present invention may be used as a clear topcoat or a pigmented color-coat common to automotive coatings. In its preferred use, the waterborne coating composition of the present invention is used as a colored basecoat, to which a clearcoat is applied, in a "color-plus-clear" coating system.

The polymeric microparticle dispersion, as previously described, is generally present in the coating composition in amounts of about to 80 percent by weight, preferably 30 to 60 percent by weight, based on total weight of resin solids.

The waterborne coating composition of the present invention can be applied at high application solids; i.e., greater than 30 percent, at low application solids; i.e., less than 20 percent, or in between. Typically, the solids content of the waterborne coating composition is from 15 to 40 percent. The compositions have good leveling and flow characteristics, exhibiting an excellent automotive quality finish, demonstrated by the excellent appearance with respect to flop. The composition also has excellent cure response and humidity resistance, as well as low volatile organic content. Generally, the volatile organic content is less than about 3.5 pounds per gallon, usually less than 3.0 pounds per gallon, and preferably less than about 2.5 pounds per gallon.

Coating compositions of the present invention can be applied to various substrates to which they adhere, including wood, metals, glass, cloth plastic, foam, including elastomeric substrates and the like. They are particularly useful in applying over metals and elastomeric substrates that are found on motor vehicles. The compositions can be applied by conventional means including brushing, dipping, flow coating, spraying and the like, but they are most often applied by spraying. The usual spray techniques and equipment for air spraying and electrostatic spraying and either manual or automatic methods can be used.

During application of the coating composition to the substrate, ambient relative humidity may range from about 20 to about 80 percent, preferably about 50 percent to 70 percent. A film of the coating is formed on the substrate during application of the coating composition to the substrate. Typically, the coating thickness will be about 0.1 to 5 mils (2.54 to 127 microns), preferably 0.4 to 1.5 mils (10.16 to 38.1 microns) in thickness.

The waterborne coating composition of the present invention may be used as a monocoat or with other coating compositions. It is preferably used as the colored base coat layer in a "color-plus-clear" coating system.

After application of the waterborne coating to the substrate, a film is formed on the surface of the substrate by driving water out of the film by heating or by an air drying period. When the coating composition of the present invention is used as a base coat, the heating will preferably be only for a short period of time and will be sufficient to ensure that a topcoat, such as a clearcoat, can be applied to the coating if desired without the former dissolving the base coat composition. Suitable drying conditions will depend on the particular base coat composition and on the ambient humidity, but in general a drying time of from about 1 to minutes at a temperature of about 80–250° F. (20–121° C.) will be adequate to ensure that mixing of the two coats is minimized. At the same time, the base coat film is adequately wetted by the topcoat composition so that satisfactory intercoat adhesion is obtained. Also, more than one base coat and multiple top coats may be applied to develop the optimum appearance. Usually between coats, the previously applied coat is flashed; that is, exposed to ambient conditions for about 0.5 to 20 minutes.

Suitable topcoats include, but are not limited to, one and two-component solventborne clearcoats, one and two-component waterborne clearcoats, and powder clearcoats.

After application of the coating composition and any desired clearcoats, the coated substrate is heated to cure the coating layers. In the curing operation, solvents are driven off and the film-forming materials of the clearcoat and the base coat are each crosslinked. The heating or curing operation is usually carried out at a temperature in the range of from 160–350° F. (71–177° C.) but if needed, lower or higher temperatures may be used as necessary to activate crosslinking mechanisms. The thickness of the clearcoat is usually from about 0.5–5 mils (12.7 to 127 microns), preferably 1.2–3 mils (30.5 to 76.2 microns).

Typically, original automotive topcoat systems over steel may be baked at 250–300° F. (121–150° C.) to fully cure the basecoat and clearcoat layers. Coatings over elastomeric substrates such as thermoplastic olefm (TPO), acrylonitrile-butadiene-styrene (ABS), and the like must be baked at lower temperatures, such as 150–180° F. (65–82° C.). Full crosslinking of the basecoat may not be accomplished at these low temperatures, and performance properties may be reduced. The basecoat compositions of the present invention are designed to provide excellent properties, especially adhesion and water resistance, when cured at low temperature, making it possible to use the same basecoat for metallic and elastomeric substrates.

It is also becoming more popular in the industry to repair coating defects after plastic parts are attached to the vehicle with a low temperature bake as described above for elastomeric substrates (Low Bake Repair). It is desirable to use the same basecoat for both original and repair applications. It is often difficult to achieve optimum adhesion to the unsanded clearcoat surface at low bake temperatures as many clearcoat surfaces tend to be very hydrophobic. This may be due to hydrophobic surface active materials or silicon modifications present in many clearcoats. The basecoat compositions of the present invention provide excellent low bake repair properties, especially adhesion and water resistance, over hydrophobic clearcoats.

The invention will be further described by reference to the following examples. Unless otherwise indicated, all parts are by weight.

EXAMPLES

Polyester Examples I to VII illustrate the preparation of fatty acid-containing polyesters and Latex Examples I to IX illustrate dispersions (latices) prepared with the fatty acid-containing polyesters.

Polyester Example I
Polyester with 48% Stearic Acid

The polyester was prepared in a four-neck round bottom flask equipped with a thermometer, mechanical stirrer, condenser, dry nitrogen sparge, and a heating mantle. The following ingredients were used:

| | |
|---|---|
| 1728.0 g | stearic acid |
| 771.0 g | pentaerythritol |
| 455.0 g | crotonic acid |

| | |
|---|---|
| 659.0 g | phthalic anhydride |
| 7.8 g | dibutyltin oxide |
| 7.8 g | triphenyl phosphite |
| 789.0 g | butyl acrylate |

The first six ingredients were stirred in the flask at 210° C. until 262 milliliters (ml) of distillate was collected and the acid value dropped to 4.8. The material was cooled to 80° C. and the last two ingredients were stirred in. The final product was a waxy solid with a hydroxyl value of 29.6, a weight average molecular weight of 9580, and a non-volatile content of 82.4 percent (measured at 110° C. for one hour).

Polyester Example II
Polyester with 48% Isostearic Acid

The polyester was prepared in a four-neck round bottom flask equipped with a thermometer, mechanical stirrer, condenser, dry nitrogen sparge, and a heating mantle. The following ingredients were used:

| | |
|---|---|
| 1728.0 g | isostearic acid |
| 771.0 g | pentaerythritol |
| 455.0 g | crotonic acid |
| 659.0 g | phthalic anhydride |
| 7.8 g | dibutyltin oxide |
| 7.8 g | triphenyl phosphite |
| 807.0 g | butyl acrylate |
| 4.1 g | Ionol (butylated hydroxytoluene) |

The first six ingredients were stirred in the flask at 210° C. until 275 ml of distillate was collected and the acid value dropped to 4.3. The material was cooled to 95° C. and the last two ingredients were stirred in. The final product was a viscous yellow liquid with a hydroxyl value of 32.9, a Gardner-Holdt viscosity of X+, a weight average molecular weight of 8640, and a non-volatile content of 79.5 percent.

Polyester Example III
Polyester with 36% Isostearic Acid

The polyester was prepared in a four-neck round bottom flask equipped with a thermometer, mechanical stirrer, condenser, dry nitrogen sparge, and a heating mantle. The following ingredients were used:

| | |
|---|---|
| 1103.0 g | isostearic acid |
| 800.0 g | pentaerythritol |
| 470.0 g | crotonic acid |
| 688.0 g | phthalic anhydride |
| 6.1 g | dibutyltin oxide |
| 6.1 g | triphenyl phosphite |
| 1170.0 g | butyl acrylate |
| 4.0 g | Ionol (butylated hydroxytoluene) |

The first six ingredients were stirred in the flask at 210° C. until 245 ml of distillate was collected and the acid value dropped to 4.6. The material was cooled to 77° C. and the last two ingredients were stirred in. The final product was a viscous yellow liquid with a hydroxyl value of 54.0, a Gardner-Holdt viscosity of Z+, a weight average molecular weight of 45,600, and a non-volatile content of 70.2%.

Polyester Example IV
Polyester with 24% Isostearic Acid

The polyester was prepared in a four-neck round bottom flask equipped with a thermometer, mechanical stirrer, condenser, dry nitrogen sparge, and a heating mantle. The following ingredients were used:

| | |
|---|---|
| 773.0 g | isostearic acid |
| 1000.0 g | pentaerythritol |
| 588.0 g | crotonic acid |
| 859.0 g | phthalic anhydride |
| 6.4 g | dibutyltin oxide |
| 6.4 g | triphenyl phosphite |
| 1137.0 g | butyl acrylate |
| 3.7 g | Ionol (butylated hydroxytoluene) |

The first six ingredients were stirred in the flask at 210° C. until 275 ml of distillate was collected and the acid value dropped to 1.2. The material was cooled to 95° C. and the last two ingredients were stirred in. The final product was a viscous yellow liquid with a hydroxyl value of 32.9, a Gardner-Holdt viscosity of Z6−, a weight average molecular weight of 55,700, and a non-volatile content of 70.0 percent.

Polyester Example V
Urethane-Modified Polyester with 48% Isostearic Acid

The polyester was prepared in a four-neck round bottom flask equipped with a thermometer, mechanical stirrer, condenser, dry nitrogen sparge, and a heating mantle. The following ingredients were used:

| | |
|---|---|
| 1500.0 g | isostearic acid |
| 671.0 g | pentaerythritol |
| 574.0 g | phthalic anhydride |
| 6.3 g | dibutyltin oxide |
| 6.3 g | triphenyl phosphite |
| 716.0 g | butyl acrylate |
| 3.7 g | Ionol (butylated hydroxytoluene) |
| 352.4 g | adduct of hydroxyethyl methacrylate and isophorone diisocyanate (3:2 by weight), 79% solution in methyl isobutyl ketone |

The first five ingredients were stirred in the flask at 210° C. until 148 ml of distillate was collected and the acid value dropped to 4.4. The material was cooled to 80° C. and the next two ingredients were stirred in. The solution was heated to 80° C. under an atmosphere of air. The final ingredient was added over 30 minutes and the resulting solution was held for an additional one hour at 80° C. The final product was a viscous yellow liquid with a Gardner-Holdt viscosity of Z3+, a weight average molecular weight of 7670, and a non-volatile content of 77.0 percent.

Polyester Example VI
Polyester with 48% Isostearic Acid (Non-grafting)

The polyester was prepared in a four-neck round bottom flask equipped with a thermometer, mechanical stirrer, condenser, dry nitrogen sparge, and a heating mantle. The following ingredients were used:

| | |
|---|---|
| 1728.0 g | isostearic acid |
| 771.0 g | pentaerythritol |
| 455.0 g | benzoic acid |
| 659.0 g | phthalic anhydride |

| | |
|---|---|
| 7.8 g | dibutyltin oxide |
| 7.8 g | triphenyl phosphite |
| 817.0 g | butyl acrylate |
| 4.1 g | Ionol (butylated hydroxytoluene) |

The first six ingredients were stirred in the flask at 210° C. until 246 ml of distillate was collected and the acid value dropped to 4.7. The material was cooled to 79° C. and the last two ingredients were stirred in. The final product was a viscous yellow liquid with a hydroxyl value of 51.0, a Gardner-Holdt viscosity of Z–, a weight average molecular weight of 6120, and a non-volatile content of 80.5 percent.

Polyester Example VII
Polyester with 48% Lauric Acid

The polyester was prepared in a four-neck round bottom flask equipped with a thermometer, mechanical stirrer, condenser, dry nitrogen sparge, and a heating mantle. The following ingredients were used:

| | |
|---|---|
| 1728.0 g | lauric acid |
| 830.0 g | pentaerythritol |
| 455.0 g | crotonic acid |
| 600.0 g | phthalic anhydride |
| 7.8 g | dibutyltin oxide |
| 7.8 g | triphenyl phosphite |
| 749.0 g | butyl acrylate |
| 4.1 g | Ionol (butylated hydroxytoluene) |

The first six ingredients were stirred in the flask at 210° C. until 395 ml of distillate was collected and the acid value dropped to 4.5. The material was cooled to 79° C. and the last two ingredients were stirred in. The final product was a viscous yellow liquid with a hydroxyl value of 29.0, a Gardner-Holdt viscosity of Q–, a weight average molecular weight of 3900, and a non-volatile content of 80.7 percent.

Latex Example I
Dispersion of Polymeric Microparticles (Latex) with 40% Polyester with 48% Stearic Acid A pre-emulsion was prepared by stirring together the following ingredients:

| | |
|---|---|
| 500.0 g | polyester of example I |
| 180.0 g | methyl methacrylate |
| 270.0 g | butyl acrylate |
| 30.0 g | ethylene glycol dimethacrylate |
| 20.0 g | acrylic acid |
| 46.4 g | dodecylbenzenesulfonic acid (70% in isopropanol) |
| 14.3 g | dimethylethanolamine |
| 1000.0 g | water |

The pre-emulsion was passed once through a Microfluidizer® M110T at 8000 psi and transferred to a four-neck round bottom flask equipped with an overhead stirrer, condenser, thermometer, and a nitrogen atmosphere. One hundred fifty grams (150.0 g) of water used to rinse the Microfluidizer® was added to the flask. The polymerization was initiated by adding 3.0 g of isoascorbic acid and 0.02 g of ferrous ammonium sulfate dissolved in 120.0 g water followed by a ten minute addition of 5.0 g of 70% t-butyl hydroperoxide dissolved in 115.0 g of water. The temperature of the reaction increased from 25° C. to 66° C. The temperature was reduced to <30° C. and 1.0 g of isoascorbic acid dissolved in 8.0 g water was added. Ten minutes later 17 g of 33.3% aqueous dimethylethanolamine was added followed by 2.0 g of Proxel GXL (Biocide available from ICI Americas, Inc.) in 8.0 g of water. The final pH of the latex was 6.1, the nonvolatile content was 41.8%, the Brookfield viscosity was 11 cps (spindle #1, 50 rpm), and the particle size was 170 nanometers (nm).

Latex Example II
Latex with 20% Polyester with 48% Isostearic Acid

A pre-emulsion was prepared by stirring together the following ingredients:

| | |
|---|---|
| 286.0 g | polyester of example II |
| 664.0 g | butyl acrylate |
| 30.0 g | ethylene glycol dimethacrylate |
| 20.0 g | acrylic acid |
| 46.4 g | dodecylbenzenesulfonic acid (70% in isopropanol) |
| 14.3 g | dimethylethanolamine |
| 1000.0 g | water |

The reaction was carried out using the same procedure and materials as in Latex Example I. The reaction exothermed from 23° C. to 73° C. The final pH of the latex was 6.5, the nonvolatile content was 42.6%, and the Brookfield viscosity was 15 cps (spindle #1, 50 rpm).

Latex Example III
Latex with 20% Polyester with 36% Isostearic Acid

A pre-emulsion was prepared by stirring together the following ingredients:

| | |
|---|---|
| 286.0 g | polyester of example III |
| 664.0 g | butyl acrylate |
| 30.0 g | ethylene glycol dimethacrylate |
| 20.0 g | acrylic acid |
| 46.4 g | dodecylbenzenesulfonic acid (70% in isopropanol) |
| 14.3 g | dimethylethanolamine |
| 1000.0 g | water |

The reaction was carried out using the same procedure and materials as in Latex Example I. The reaction exothermed from 23° C. to 80° C. The final pH of the latex was 6.1, the nonvolatile content was 42.4%, the particle size was 105 nm, and the Brookfield viscosity was 14 cps (spindle #1, 50 rpm).

Latex Example IV
Latex with 20% Polyester with 24% Isostearic Acid

A pre-emulsion was prepared by stirring together the following ingredients:

| | |
|---|---|
| 286.0 g | polyester of example IV |
| 664.0 g | butyl acrylate |
| 30.0 g | ethylene glycol dimethacrylate |
| 20.0 g | acrylic acid |
| 46.4 g | dodecylbenzenesulfonic acid (70% in isopropanol) |
| 14.3 g | dimethylethanolamine |
| 1000.0 g | water |

The reaction was carried out using the same procedure and materials as in Latex Example I. The reaction exothermed from 28° C. to 74° C. The final pH of the latex was 6.9, the nonvolatile content was 44.0%, and the Brookfield viscosity was 19 cps (spindle #1, 50 rpm).

Latex Example V

Latex with 20% Urethane-Modified Polyester with 48% Isostearic Acid

A pre-emulsion was prepared by stirring together the following ingredients:

| | |
|---|---|
| 250.0 g | urethane-modified polyester of example V |
| 250.0 g | methyl methacrylate |
| 450.0 g | butyl acrylate |
| 30.0 g | ethylene glycol dimethacrylate |
| 20.0 g | acrylic acid |
| 46.4 g | dodecylbenzenesulfonic acid (70% in isopropanol) |
| 14.3 g | dimethylethanolamine |
| 1000.0 g | water |

The reaction was carried out using the same procedure and materials as in Latex Example I. The reaction exothermed from 24° C. to 79° C. The final pH of the latex was 6.5, the nonvolatile content was 41.7%, and the Brookfield viscosity was 17 cps (spindle #1, 50 rpm).

Latex Example VI

Latex with 20% Polyester with 48% Isostearic Acid (Non-grafting)

A pre-emulsion was prepared by stirring together the following ingredients:

| | |
|---|---|
| 250.0 g | polyester of example VI |
| 450.0 g | butyl acrylate |
| 250.0 g | methyl methacrylate |
| 30.0 g | ethylene glycol dimethacrylate |
| 20.0 g | acrylic acid |
| 46.4 g | dodecylbenzenesulfonic acid (70% in isopropanol) |
| 14.3 g | dimethylethanolamine |
| 1000.0 g | water |

The reaction was carried out using the same procedure and materials as in Latex Example I. The reaction exothermed from 25° C. to 78° C. The final pH of the latex was 5.9, the nonvolatile content was 41.8%, and the Brookfield viscosity was 17 cps (spindle #1, 50 rpm).

Latex Example VII

Latex with 40% Polyester with 48% Lauric Acid

A pre-emulsion was prepared by stirring together the following ingredients:

| | |
|---|---|
| 500.0 g | polyester of example VII |
| 270.0 g | butyl acrylate |
| 180.0 g | methyl methacrylate |
| 30.0 g | ethylene glycol dimethacrylate |
| 20.0 g | acrylic acid |
| 46.4 g | dodecylbenzenesulfonic acid (70% in isopropanol) |
| 14.3 g | dimethylethanolamine |
| 1000.0 g | water |

The reaction was carried out using the same procedure and materials as in Latex Example I. The reaction exothermed from 28° C. to 67° C. The final pH of the latex was 6.0, the nonvolatile content was 41.6%, and the Brookfield viscosity was 12 cps (spindle #1, 50 rpm).

Latex Example VIII

Latex with decreased AA in shell

A pre-emulsion with a pH of 1.5 was prepared by stirring together the following ingredients:

| | |
|---|---|
| 295.0 g | polyester of example III |
| 655.0 g | butyl acrylate |
| 30.0 g | ethylene glycol dimethacrylate |
| 20.0 g | acrylic acid |
| 46.4 g | dodecylbenzenesulfonic acid (70% in isopropanol) |
| 8.9 g | dimethylethanolamine |
| 1000.0 g | water |

The pre-emulsion was passed once through a Microfluidizer® M110T at 8000 psi and transferred to a four-neck round bottom flask equipped with an overhead stirrer, condenser, thermometer, and a nitrogen atmosphere. One hundred fifty grams (150.0 g) of water used to rinse the Microfluidizer® was added to the flask. The polymerization was initiated by adding 4.0 g of isoascorbic acid and 0.02 g of ferrous ammonium sulfate dissolved in 120.0 g water followed by a 30 minute addition of 4.0 g of 70% t-butyl hydroperoxide dissolved in 115.0 g of water. The temperature of the reaction increased from 30° C. to 76° C. The temperature was reduced to 25° C. and the pH of the latex was adjusted to 7.0 by the addition of 22.7 g of 33.3% aqueous dimethylethanolamine. Finally, 2.0 g of Proxel GXL in 8.0 g of water was added. The nonvolatile content was 42.3%, and the Brookfield viscosity was 31 cps.

Latex Example IX

Latex with increased AA in shell

A pre-emulsion with a pH of 6.0 was prepared by stirring together the following ingredients:

| | |
|---|---|
| 295.0 g | polyester of example III |
| 655.0 g | butyl acrylate |
| 30.0 g | ethylene glycol dimethacrylate |
| 20.0 g | acrylic acid |
| 46.4 g | dodecylbenzenesulfonic acid (70% in isopropanol) |
| 33.6 g | dimethylethanolamine |
| 1000.0 g | water |

The reaction was carried out using the same procedure and materials as in Latex Example VIII. The temperature of the reaction increased from 30° C. to 79° C. The temperature was reduced to 25° C. and the pH of the latex was adjusted to 7.0 by the addition of 5.0 g of 33.3% aqueous dimethylethanolamine. Finally, 2.0 g of Proxel GXL in 8.0 g of water was added. The nonvolatile content was 41.2%, and the Brookfield viscosity was 9 cps.

The total amount of dimethylethanolamine used in Latex Example VIII is 16.5 g and the total amount used in Latex Example IX is 35.3 g. In both latices 8.9 g (0.0100 equivalents) of dimethylethanolamine is required to neutralize the 46.4 g (0.0100 equivalents) of dodecylbenzenesulfonic acid and both latices contain 20.0 g (0.277 equivalents) of acrylic acid. Both latices were neutralized to the same pH but Latex VIII required 7.6 g (0.085 equivalents) of dimethylethanolamine and Latex IX required 26.4 g (0.296 equivalents) to neutralize the acrylic acid that was polymerized into the latex. These results indicate that there is much more acrylic acid polymerized into the shell of Latex IX than in Latex VIII. The low viscosity of both latices indicates that there is very little poly(acrylic acid), a strong thickener, in either latex.

Coating Examples

Aqueous silver metallic basecoat compositions for evaluation of the fatty acid-containing polyester latices were prepared in the following manner:

Aluminum pigment pastes were prepared by mixing the components listed in the "premix" portion of Tables 1 through 4 and allowing to stir for 15 to 30 minutes. The coating compositions were then prepared by addition of the remaining "aqueous" components, in order, with agitation. The pH of the coatings was adjusted to about 8.6 to 8.8 by addition of an appropriate amount of a 50% solution of dimethylethanolamine in deionized water. The coatings were reduced to a spray viscosity of 24 to 26 seconds (#4 Ford Cup) with deionized water.

TABLE 1

|  | EX. 1 | EX. 2 (COMPARATIVE) |
|---|---|---|
| PREMIX: |  |  |
| Ethylene glycol monohexyl ether | 22.8 | 22.8 |
| Diethylene glycol monobutyl ether | 11.0 | 11.0 |
| Polypropylene glycol[1] | 12.0 | 12.0 |
| TINUVIN ® 1130[2] | 3.0 | 3.0 |
| SHELLSOL ® 071[3] | 3.8 | 3.8 |
| Aluminum passivator[4] | 5.9 | 5.9 |
| Phosphatized epoxy[5] | 1.0 | 1.0 |
| Aluminum[6] | 23.2 | 23.2 |
| CYMEL ® 322[7] | 24.0 | 24.0 |
| AQUEOUS: |  |  |
| 50% DMEA solution | 11.0 | 11.0 |
| DI water | 65.0 | 65.0 |
| Latex from Latex Example I | 105.4 |  |
| Comparative latex[8] |  | 104.2 |
| Polyurethane dispersion[9] | 61.5 | 61.5 |
| Oligomeric polyester[10] | 12.5 | 12.5 |
| DI water | 20.4 |  |
| BASECOAT SOLIDS | 32% | 33% |

[1]MW 425 available from ARCO Chemical Co.
[2]Substituted benzotriazole UV light absorber available from Ciba Additives.
[3]Mineral spirits available from Shell Chemical Co.
[4]Prepared according to U.S. Pat. No. 5,429,674, see Example 6.
[5]Phosphatized epoxy prepared from EPON ® 828, a polyglycidyl ether of Bisphenol A, available from Shell Oil and Chemical Co.; reacted with phosphoric acid at an 83:17 weight ratio.
[6]Alpate ® 7670 NS-A, nontreated aluminum available from Toyo Aluminum K.K.
[7]Partially methylated melamine resin available from CYTEC Industries, Inc.
[8]Prepared according to U.S. Pat. No. 5,510,148, see Example I.
[9]Polyurethane/acrylic dispersion prepared as follows. A polyurethane prepolymer was prepared by blending dimethylolpropionic acid (34.9 parts); DESMODUR ® W (140.3 parts available from Bayer Corp.); dimer diisocyanate (81.3 parts, DDI 1410 available from Henkel Corp.); FORMREZ ® 66-56 (199.5 parts available from Witco Corp.); MPEG 2000 (50.3 parts available from Union Carbide, Inc.); dibutyltin dilaurate (0.4 parts); and N-methyl pyrrolidone (130.2 parts) and heating at 90° C. until the NCO equivalent weight reached 1079. The prepolymer was cooled to 35° C. and methyl methacrylate (197.9 parts), butyl acrylate (136.8 parts), and ethylene glycol dimethacrylate (14.0 parts) were added, followed by N,N-dimethylethanolamine (23.2 parts). This mixture was dispersed into deionized water (2372.1 parts) containing diethylenetriamine (18.7 parts) at 40° C. over 20 minutes and was held at 40° C. for 15 minutes. The dispersion was passed through a Microfluidizer ® emulsifier at 8000 psi and was then heated to 60° C. A solution of ammonium persulfate (1.28 parts) in deionized water (99.4 parts) was slowly added, and the temperature was adjusted to 80° C. and held for 30 minutes. The resulting polymer dispersion had a solids content of approximately 25 percent.
[10]Prepared according to U.S. Pat. No. 5,356,973, see Example A.

TABLE 2

|  | EX. 3 | EX. 4 (COMPARATIVE) |
|---|---|---|
| PREMIX: |  |  |
| Ethylene glycol monohexyl ether | 22.8 | 22.8 |
| Diethylene glycol monobutyl ether | 11.0 | 11.0 |
| Polypropylene glycol[1] | 11.5 | 11.5 |
| TINUVIN ® 1130[2] | 3.0 | 3.0 |
| SHELLSOL ® 071[3] | 3.8 | 3.8 |
| Aluminum passivator[4] | 5.9 | 5.9 |
| Phosphatized epoxy[5] | 1.0 | 1.0 |
| Aluminum[6] | 23.2 | 23.2 |
| CYMEL ® 322[7] | 11.8 | 11.8 |
| RESIMENE ® 750[11] | 11.3 | 11.3 |
| AQUEOUS: |  |  |
| 50% DMEA solution | 12.0 | 12.0 |
| DI water | 65.0 | 65.0 |
| Latex from Latex Example III | 101.0 |  |
| Comparative latex[8] |  | 99.0 |
| Polyurethane dispersion[12] | 41.0 | 41.0 |
| Oligomeric polyester[10] | 12.5 | 12.5 |
| DI water | 72.0 | 65.0 |
| BASECOAT SOLIDS | 32% | 32% |

Footnotes 1–8 and 10 are the same as referred to in the previous tables.
[11]Partially butylated melamine resin available from Monsanto Co.
[12]WITCOBOND ® W-242 available from Witco Corp.

TABLE 3

|  | EX. 5 | EX. 6 (COMPARATIVE) |
|---|---|---|
| PREMIX: |  |  |
| Ethylene glycol monohexyl ether | 22.8 | 22.8 |
| Diethylene glycol monobutyl ether | 11.0 | 11.0 |
| Polypropylene glycol[1] | 12.0 | 12.0 |
| TINUVIN ® 1130[2] | 3.0 | 3.0 |
| Aluminum passivator[4] | 6.3 | 6.3 |
| Phosphatized epoxy[5] | 0.9 | 0.9 |
| Aluminum[6] | 23.1 | 23.1 |
| CYMEL 322[7] | 24.0 | 24.0 |
| AQUEOUS |  |  |
| 50% DMEA solution | 8.0 | 8.0 |
| Oligomeric polyester[10] | 12.5 | 12.5 |
| Latex from Latex Example II | 104.7 |  |
| Comparative latex[8] |  | 104.2 |
| Polyurethane dispersion[9] | 63.6 | 63.6 |
| SHELLSOL ® 071[3] | 3.8 | 3.8 |
| 50% DMEA Solution | 3.0 | 3.0 |
| DI Water | 112.4 | 115.9 |
| BASECOAT SOLIDS | 30% | 30% |

Footnotes are the same as referred to in the previous tables.

TABLE 4

|  | EX. 7 |
|---|---|
| PREMIX: |  |
| Ethylene glycol monohexyl ether | 22.8 |
| Diethylene glycol monobutyl ether | 11.0 |
| Polypropylene glycol[1] | 12.0 |
| TINUVIN ® 1130[2] | 3.0 |
| Aluminum passivator[4] | 6.3 |
| Phosphatized epoxy[5] | 0.9 |
| Aluminum[6] | 23.1 |
| CYMEL 322[7] | 12.5 |
| RESIMENE 750[11] | 11.3 |

TABLE 4-continued

|  | EX. 7 |
|---|---|
| AQUEOUS | |
| 50% DMEA solution | 8.0 |
| Oligomeric polyester[10] | 12.5 |
| Latex from Latex Example III | 108.5 |
| Polyurethane dispersion[9] | 63.6 |
| SHELLSOL ® 071[3] | 3.8 |
| 50% DMEA Solution | 3.0 |
| DI Water | 99.0 |
| BASECOAT SOLIDS | 30% |

Footnotes are the same as referred to in the previous tables.

Coating Examples 1 and 2 (COMPARATIVE)

The pigmented coating examples from Table 1 were evaluated as follows. ACT cold roll steel panels (4"×12") were electrocoated with a cationically electrodepositable primer commercially available from PPG Industries, Inc. as ED-5000. The panels were then primed with a commercially available PPG primer surfacer coded as GPX05379 and cured for 30 minutes at 325° F.

The basecoat compositions from Table 1 were spray applied (two coats automated spray with 30 seconds ambient flash between coats) at 60% relative humidity and 70° F. to give a dry film thickness of 0.4 to 0.6 mils. The panels were flash baked for 10 minutes at 80° C. (176=° F.). The panels were then topcoated with a commercially available European acrylic melamine clearcoat from IDAC (a joint venture of ICI and DuPont Coatings) to give a dry film thickness of 1.5–1.6 mils. This clearcoat provides a surface which is extremely hydrophobic. After a minute ambient flash, the panels were cured for 30 minutes at 140° C. (285° F.). These are labeled "OEM Panels".

After 24 hours, the untouched OEM panels were recoated with the appropriate basecoat compositions and flashed as described above. The panels were then repair topcoated with a commercially available two-component isocyanate repair clear (catalyzed with 0.18% of a 5% solution of dibutyltin-dilaurate in 2-ethoxyethyl propionate) from BASF Corp. to give a dry film thickness of 1.6 to 1.8 mils. After a 10-minute ambient flash, the panels were cured for 50 minutes at 92° C. (195° F.). These panels are labeled "Low Bake Repair Panels".

The adhesion results of the Low Bake Repair Panels are shown before and after humidity testing (10 days, 100° F. condensing humidity cabinet) in Table 5. A standard cross-hatch adhesion test was performed with a 2 mm multiblade claw one hour after bake or removal of panel from humidity cabinet. Black TESA® tape coded 4651 from Beiersdorf AG was used for the testing. The rating method is as follows. A rating of 5 corresponds to 100% adhesion, for a 4 rating small flakes of coating are detached at intersections and less than 5% of the lattice is affected, a 3 corresponds to from 5 to 15% detachment, a 2 is from 15 to 35% detachment, a 1 is from 35 to 65% detachment, and a 0 is greater than 65% adhesion loss. Values are shown for OEM clearcoat to repair basecoat adhesion and for repair basecoat to repair clearcoat adhesion.

TABLE 5

| LOW BAKE REPAIR ADHESION | EX. 1 | EX. 2 (COMPARATIVE) |
|---|---|---|
| BEFORE HUMIDITY | | |
| REP BC to OEM CC | 5 | 0 |
| REP CC to REP BC | 2 | 0 |
| AFTER HUMIDITY | | |
| REP CC to OEM CC | 0 | 0 |
| REP CC to REP BC | 0 | 0 |

The results from Table 5 show that the basecoat prepared with the fatty acid-containing polyester example provides improved low-bake repair adhesion relative to Comparative Example 2, a commercial quality coating, and after humidity testing, adhesion is equivalent or better than the Comparative Example.

Coating Examples 3 and 4 (COMPARATIVE)

The pigmented coating examples from Table 2 were evaluated as follows. ACT cold roll steel panels (4"×12") were electrocoated with a cationically electrodepositable primer commercially available from PPG Industries, Inc. as ED-5000. The panels were then primed with a commercially available PPG primer surfacer coded as GPX05379 and cured for 30 minutes at 325° F.

The basecoat compositions from Table 2 were spray applied (two coats automated spray with 30 seconds ambient flash between coats) at 60% relative humidity and 70DF to give a dry film thickness of 0.4 to 0.6 mils. The panels were flash baked for 10 minutes at 80° C. (176° F.). The panels were then topcoated with a commercially available two-component isocyanate clearcoat from BASF Corp. to give a dry film thickness of 1.6–1.8 mils. This clearcoat provides a surface which is extremely hydrophobic. After a 10-minute ambient flash, the panels were cured for 30 minutes at 145° C. (293° F.). These are labeled "OEM Panels".

After 24 hours, the untouched OEM panels are recoated with the appropriate basecoat compositions and flashed as described above. The panels were then repair topcoated with a commercially available two-component isocyanate repair clear (catalyzed with 0.18% of a 5% solution of dibutyltin-dilaurate in 2-ethoxyethyl propionate) from BASF Corp. to give a dry film thickness of 1.6 to 1.8 mils. After a 10-minute ambient flash, the panels were cured for 50 minutes at 90.5° C. (195° F.). These panels are labeled "Low Bake Repair Panels". Film Properties are shown in Table 6.

TABLE 6

|  | EX. 3 | EX. 4 (COMPARATIVE) |
|---|---|---|
| OEM PROPERTIES | | |
| DOI[13] | 88 | 86 |
| 20° GLOSS[14] | 90 | 89 |
| FLIP/FLOP[15] | 1.71 | 1.72 |
| AFTER WATERSOAK[16] | | |
| DOI | 82 | 66 |
| 20° GLOSS | 88 | 87 |
| ADHESION[17] | 5 | 5 |
| BLISTERING | NONE | NONE |

TABLE 6-continued

|  | EX. 3 | EX. 4 (COMPARATIVE) |
|---|---|---|
| LOW BAKE REPAIR PROPERTIES |  |  |
| ADHESION AFTER HUMIDITY[18] | 5 | 0 |
| DOI | 68 | 49 |
| 20° GLOSS | 87 | 75 |
| ADHESION | 5 | 0 |
| BLISTERING | NONE | MODERATE |

[13]Distinction of Image (DOI) was measured by Hunter Lab's Dorigon II where higher numbers indicate better performance.
[14]Specular gloss reading measured at a 20° angle with a Novo Gloss Statistical Glossmeter from Gardco where higher numbers indicate better performance.
[15]Ratio of face and angular reflectance measured on an Alcope LMR-200 multiple angle reflectometer where higher numbers show a greater face/flop difference.
[16]Water immersion test: 48 hours in 63° C. water.
[17]Crosshatch adhesion test described above.
[18]10 days in 100° F. condensing humidity cabinet.

The results from Table 6 show that the basecoat from Example 3 provides appearance at least equivalent to Comparative Example 4, a commercial quality coating, and an improvement in OEM water resistance. Low bake repair adhesion before and after humidity gave a perfect rating for Example 3, whereas the Comparative Example shows adhesion loss and reduced appearance after humidity testing.

Coating Examples 5 and 6 (COMPARATIVE)

The pigmented coatings from Table 3 were evaluated over plastic substrates as follows. TPO 880 panels, available from D&S Plastics International, were hand sprayed with a commercial solventborne adhesion promoter coded as MPPA-4110, available from PPG Industries, Inc. to give a dry film thickness of about 0.2 mils. These were allowed to dry at ambient conditions.

The basecoat examples from Table 3 were spray applied (2 coats automated spray with a 90 second ambient flash between coats) at 60% relative humidity and 72° F. to give a dry film thickness of 0.4 to 0.5 mils. The panels were given a 10 minute ambient flash, followed by a 10 minute 180° F. flash bake. The panels were then topcoated with a commercially available 2 component isocyanate low bake clearcoat coded as R570I403, available from PPG Industries, Inc. to give a dry film thickness of 1.9 mils. The panels were given a minute ambient flash and were cured for 30 minutes at 180° F. Film properties are shown in Table 7.

TABLE 7

|  | EX. 5 | EX. 6 (COMPARATIVE) |
|---|---|---|
| INITIAL RBSULTS |  |  |
| DOI[13] | 89 | 80 |
| 20° GLOSS[14] | 90 | 89 |
| FLIP/FLOP[15] | 1.68 | 1.58 |
| ADHESION[19] | 5 | 5 |
| WATERSOAK RESULTS[20] |  |  |
| DOI | 40 | 50 |
| 20° GLOSS | 87 | 74 |
| ADHESION[19] | 4 | 0 |
| BLISTERING | NONE | MODERATE |

TABLE 7-continued

|  | EX. 5 | EX. 6 (COMPARATIVE) |
|---|---|---|
| HUMIDITY RESULTS[18] |  |  |
| DOI | 30 | 20 |
| 20° GLOSS | 80 | 62 |
| ADHESION[19] | 3 | 0 |
| BLISTERING | NONE | SEVERE |

Footnotes 13–18 are the same as referred to in the previous tables.
[19]A 10 × 10 perpendicular crosshatch pattern scribed with a razor knife and a 2 mm template. Tested with Nichiban tape and rated as described above (i.e. 5 = no adhesion loss, 0 = greater than 65% adhesion loss).
[20]Water immersion test: 48 hours in 140° F. water.

The results from Table 7 show that adhesion to TPO is greatly enhanced after water or humidity testing with the fatty acid-containing polyester latex containing basecoat relative to the commercial quality comparative example 6.

The basecoat from Example 5 was also evaluated over a variety of plastic substrates as follows. Appryl 7280 and Stamylan P86MF97 panels (European TPO available from Himont Plastics) were coated with the MPP-4110 adhesion promoter as described above. ABS panels were hand sprayed with a commercially available two-component plastic printer coded as 3877-P-6653, available from PPG Industries, Inc. The basecoat from Example was applied to the panels and clearcoated as described above. Film properties are shown in Table 8.

TABLE 8

Coating Example 5

| SUBSTRATE | Appryl 7280 | Stamylan P86MF97 | ABS |
|---|---|---|---|
| INITIAL RESULTS |  |  |  |
| DOI[13] | 85 | 85 | 80 |
| 20° GLOSS[14] | 92 | 92 |  |
| FLIP/FLOP[15] | 1.73 | 1.73 | 1.66 |
| ADHESION[19] | 3 | 5 | 5 |
| WATERSOAK RESULTS[20] |  |  |  |
| DOI | 50 | 45 | 50 |
| 20° GLOSS | 87 | 90 | 85 |
| ADHESION[19] | 5 | 0 | 5 |
| BLISTERING | NONE | NONE | NONE |
| HUMIDITY RESULTS[18] |  |  |  |
| DOI | 45 | 50 | 50 |
| 20° GLOSS | 88 | 85 | 57 |
| ADHESION[19] | 4 | 5 | 5 |
| BLISTERING | NONE | NONE | NONE |

Footnotes 13–20 are the same as referred to in the previous tables.

Coating Example 7

The pigmented coatings from Table 4 were evaluated over plastic substrates as follows. D&S TPO 880 panels were hand sprayed with a commercial solventborne adhesion promoter coded as MPP-4110, available from PPG Industries, Inc. to give a dry film thickness of about 0.2 mils. These were allowed to dry at ambient conditions.

The basecoat examples from Table 4 were spray applied (two coats automated spray with a 90-second ambient flash between coats) at 60% relative humidity and 72° F. to give a dry film thickness of 0.4 to 0.5 mils. The panels were given a 10-minute ambient flash, followed by a 10 minute 180° F. flash bake. The panels were then topcoated with a commercially available two component isocyanate low bake clearcoat coded as R570I403, available from PPG Industries, Inc. to give a dry film thickness of 1.9 mils. The panels were given a 10-minute ambient flash and were cured for 30 minutes at 180° F. Film properties are shown in Table 9.

TABLE 9

|  | EX. 7 |
| --- | --- |
| INITIAL RESULTS | |
| DOI[13] | 50 |
| 20° GLOSS[14] | 88 |
| FLIP/FLOP[15] | 1.75 |
| ADHESION[19] | 5 |
| WATERSOAK RESULTS[20] | |
| DOI | 35 |
| 20° GLOSS | 84 |
| ADHESION[19] | 1 |
| BLISTERING | VERY SLIGHT |
| HUMIDITY RESULTS[18] | |
| DOI | 50 |
| 20° GLOSS | 78 |
| ADHESION[19] | 2 |
| BLISTERING | NONE |

Footnotes 13–20 are the same as referred to in the previous tables.

fatty acid-containing polyester

Coating Example 8

An aqueous silver metallic basecoat composition was prepared as follows. A thickener portion was prepared was prepared by combining the first two components of "thickener portion" of Table 10 and agitating for 20 minutes. The third component was added and the mixture was agitated an additional minutes and set aside. The components of the "aqueous portion" of Table 10 were combined, in order, with agitation and this mixture was set aside.

The first six components of the "solvent portion" of Table 10 were combined under agitation and the mixture was allowed to stir for 20 minutes. The last three components were then blended into the mixture. While under agitation, the "aqueous portion" was slowly added to the "solvent portion" and allowed to thoroughly mix for 5 minutes. The "thickener portion" was then slowly added, and the entire formula was allowed to mix for about 10 minutes.

The pH of the coating was adjusted to 8.8 to 9.0 with a 50% solution of dimethylethanolarnine in deionized water. The low shear viscosity (#2 spindle, 6 rpm) was adjusted to 2500+/−10% with deionized water.

TABLE 10

|  | EXAMPLE 8 |
| --- | --- |
| THICKENER PORTION | |
| Deionized water | 263.5 |
| Laponite ® RD[21] | 4.22 |
| Polypropylene glycol[1] | 8.3 |
| AQUEOUS PORTION | |
| Deionized water | 63.2 |
| SHELLSOL 071[3] | 6.9 |
| Latex from Latex Example III | 88.3 |
| Polyurethane dispersion[22] | 39.5 |
| 50% DMEA solution | 0.5 |
| Acrylic grind dispersion[23] | 29.9 |

TABLE 10-continued

|  | EXAMPLE 8 |
| --- | --- |
| SOLVENT PORTION | |
| MELMAC ® 243-3[24] | 16.2 |
| CYMEL 322[7] | 30.9 |
| Aluminum Passivator[25] | 10.4 |
| Phosphatized Epoxy[5] | 1.9 |
| TINUVIN 1130[2] | 3.2 |
| Aluminum[26] | 25.0 |
| Ethylene glycol monohexyl ether | 15.6 |
| n-Butanol | 5.3 |
| n-Amyl alcohol | 5.3 |
| BASECOAT SOLIDS | 20% |

Footnotes 1–3, 5 and 7 are the same as referred to in the previous tables.
[21]Sodium magnesium phyllosilicate thickener available from Southern Clay Products, Inc.
[22]Polyurethane/acrylic dispersion prepared as follows. A polyurethane prepolymer was prepared by blending dimethylolpropionic acid (47.8 parts), DESMODUR ® W (267.5 parts, available from Bayer Corp.), a polyol comprised of EMPOL ® 1008 (available from Henkel Corp.) and CARDURA ® E (available from Union Carbide, Inc.) reacted in a 1:1 equivalent ratio (111.7 parts), FORMREZ ® 66-56 (230.8 parts, available from Witco Corp.), dibutyltin dilautate (0.56 parts), and N-methylpyrrolidone (83.6 parts) and heating at 82° C. until the NCO equivalent weight reached 824. The prepolymer was cooled to 35° C. and methyl methacrylate (253.2 parts), butyl acrylate (146.3 parts), and a polyol comprised of glycidyl methacrylate, EMPOL ® 1008, and CARDURA ® E reacted in a 1:1:1 equivalent ratio (56.8 parts) were added followed by N,N-dimethylethanolamine (31.8 parts). This mixture was dispersed into deionized water (2089.0 parts) containing ethylenediamine (24.9 parts), and the dispersion was heated to 40° C. for 15 minutes. The temperature was increased to 70° C. and ALIPAL ® CO436 (18.7 parts, available from Rhone-Poulenc, Inc.), followed by slow addition of a solution of ammonium persulfate (1.69 parts) in deionized water (137.2 parts). The temperature was adjusted to 80° C. and held for 30 minutes. The resulting polymer dispersion had a solids contents of approximately 32 percent.
[23]Acrylic dispersion grind vehicle (35% butyl acrylate, 30% styrene, 18% butyl methacrylate, 8.5% hydroxyethyl acrylate, and 8.5% acrylic acid).
[24]Polymeric melamine resin available from CYTEC Industries, Inc.
[25]V-1468 passivator solution available from Lubrizol Corp.
[26]Alpate TCR6140, nontreated aluminum available from Toyo Aluminum K. K.

The basecoat from Example 8 exhibits excellent adhesion and water resistance as was shown in previous examples. This indicates these fatty acid-containing polyester latices can be used in lower solids formulations to provide enhanced smoothness and metallic control under a broad humidity range, when applied in typical fashion for automotive basecoatic clearcoat applications.

It will be appreciated by those skilled in the art that changes could be made to the embodiments described above without departing from the broad inventive concept thereof. It is understood, therefore, that this invention is not limited to the particular embodiments disclosed, but it is intended to cover modifications which are within the spirit and scope of the invention, as defined by the appended claims.

Therefore, we claim:

1. Waterborne coating composition, comprising:
   a) a dispersion of internally crosslinked polymeric microparticles in an aqueous medium wherein the microparticles are prepared by
      (i) forming a mixture in the aqueous medium of ethylenically unsaturated monomers and a substantially hydrophobic, saturated fatty acid-containing polyester having an acid value of less than 5,
      wherein the ethylenically unsaturated monomers comprise one or more ethylenically unsaturated monomers having more than one site of unsaturation selected from ethylene glycol dimethacrylate, allyl methacrylate, hexanediol diacrylate, methacrylic anhydride, tetraethylene glycol diacrylate, tripropylene glycol diacrylate and mixtures thereof, and wherein the amount of saturated fatty acid used to prepare the polyester ranges from about 20 to 80 weight percent of the total weight of the fatty acid-containing polyester, the fatty acid-containing polyester containing functional groups which are capable of reacting with a crosslinking agent; and (ii) particularizing the mixture into microparticles by high stress techniques followed by (iii) polymerizing polymerizable species within the microparticles to produce the polymeric microparticles;

the amount of the fatty acid-containing polyester in the dispersion being at least and up to 70 weight percent based on weight of the ethylenically unsaturated monomers and fatty acid-containing polyester, and the amount of the polymeric microparticles in the coating composition being from 20 to 80 weight percent based on total weight of resin solids in the coating composition; and b) a crosslinking agent.

2. The waterborne coating composition according to claim 1, wherein the fatty acid-containing polyester has hydroxyl functional groups which are capable of reacting with a crosslinking agent.

3. The waterborne coating composition according to claim 2, wherein the fatty acid-containing polyester is urethane-modified.

4. The waterborne coating composition according to claim 1, wherein the amount of fatty acid used to prepare the fatty acid-containing polyester is between 20 to 50 percent by weight.

5. The waterborne coating composition according to claim 1, wherein the amount of the fatty acid-containing polyester in the dispersion is between 10 to 50 percent by weight.

6. The waterborne coating composition according to claim 1, wherein the fatty acid-containing polyester has a number average molecular weight greater than about 600.

7. The waterborne coating composition according to claim 1, wherein the fatty acid-containing polyester has a molecular weight between 600 and 4000.

8. The waterborne coating composition according to claim 1, wherein the fatty acid is selected from the group consisting of lauric acid, stearic acid, isostearic acid, oleic acid, coconut fatty acid, myristic acid, palmitic acid, arachidic acid and hydrogenated dimer fatty acids.

9. The waterborne coating composition according to claim 1, wherein the ethylenically unsaturated monomers are selected from the group consisting of acrylic monomers and vinyl monomers.

10. The waterborne coating composition according to claim 1, wherein the fatty acid-containing polyester is grafted to the polymer formed from the ethylenically unsaturated monomers.

11. The waterborne coating composition according to claim 1, wherein the crosslinking agent is selected from the group consisting of aminoplasts and polyisocyanate crosslinking agents.

12. The waterborne coating composition according to claim 1, further comprising a pigment.

13. The waterborne coating composition according to claim 1, wherein the waterborne coating composition has a volatile organic content of less than about 3.5 pounds per gallon.

* * * * *

UNITED STATES PATENT AND TRADEMARK OFFICE
CERTIFICATE OF CORRECTION

PATENT NO. : 6,281,272 B1
DATED : August 28, 2001
INVENTOR(S) : Baldy et al.

It is certified that error appears in the above-identified patent and that said Letters Patent is hereby corrected as shown below:

<u>Column 23,</u>
Line 12, "dispersion being at least and up to 70 weight percent" should be
-- dispersion being at least 10 and up to 70 weight percent --

Signed and Sealed this

Third Day of September, 2002

Attest:

Attesting Officer

JAMES E. ROGAN
*Director of the United States Patent and Trademark Office*